United States Patent Office 3,499,934
Patented Mar. 10, 1970

3,499,934
TRIHALO TRIFORMYL BENZENES
William J. Pyne, Painesville, Ohio, assignor to Diamond Shamrock Corporation, a corporation of Delaware
No Drawing. Filed Feb. 1, 1967, Ser. No. 613,122
Int. Cl. C07c 47/52; A01n 9/24
U.S. Cl. 260—599     2 Claims

ABSTRACT OF THE DISCLOSURE

Trihalo triformyl benzenes are disclosed along with their preparation by the acid hydrolysis of corresponding tris-(dihalomethyl)-trihalo benzenes. The compounds herein disclosed are active as fungicides, nematocides, bactericides, and herbicides.

SUMMARY OF THE INVENTION

The present invention relates to a composition of matter consisting of a compound having the structure:

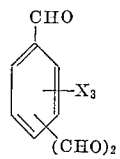

wherein X is halogen, i.e., chlorine, fluorine, bromine or iodine and preferably chlorine for economy. The invention also relates to the manner of preparing such compounds, from precursors corresponding to the formula:

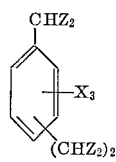

wherein X is as defined hereinabove and Z is chlorine or bromine. The invention further relates to biologically active compositions containing the compounds disclosed herein and also relates to the method of killing pests by contacting said pests with a pesticidal amount of such compounds.

As used herein the terms "pesticide," "pesticidal," and "killing pests" are employed for convenience to refer to the killing and/or controlling of at least one growth such as undesirable plants, micro-organisms, fungi, bacteria and thus "pesticidal compositions" can include compositions which are commonly known as bactericides, fungicides, nematocides, herbicides and the like.

DESCRIPTION OF THE PREFERRED EMBODIMENTS

The compounds of this invention can be prepared by the acid hydrolysis of corresponding tris-(dichloromethyl)-trihalo benzenes or tris-(dibromomethyl)-trihalo benzenes, i.e., trifluoro, trichloro, tribromo, or triiodo benzenes. The acid for the hydrolysis reaction should be a mineral acid, such as hydrochloric or sulfuric acid, but is preferably sulfuric acid for efficiency and economy. To enhance completion of the reaction, the reaction temperature is advantageously maintained above about 80° C., but for economy, does not substantially exceed a temperature of about 190° C. Typically, as the reaction approaches completion, hydrogen chloride or hydrogen bromide evolution is monitored to determine termination of the reaction.

In using the compounds of this invention as pesticides they can be applied as such or they can be extended with a liquid or solid diluent. The compounds of this invention can, for example, be combined or formulated into suitable compositions for spraying or drenching or, if desired, formulated as an emulsifiable concentrate. Alternatively, the compounds can, of course, be formulated into appropriate use compositions by mixing a toxic amount thereof with a conditioning agent of the kind used and referred to in the art of the pest control adjuvant.

Pesticidal compositions embodying the invention can be prepared in the form of solids or liquids. Solid compositions, preferably in the form of wettable powders, are compounded to give homogeneous free-flowing powder by mixing the active ingredient with finely divided solids, Attaclays, diatomaceous earth, synthetic fine silica or flours, such as walnut shell, redwood, soybean, cotton seed flour or other solid conditioning agents or carriers of the kind conventionally employed in preparing pest control compositions in solid or liquid form.

Even more preferable among solid compositions, in some instances, are granules or pellets when the application is primarily to the soil. Granules may be prepared by impregnating granular diluents such as granular Attaclay or may be made by first extending powdered solid with powdered diluent and subsequently granulating. Pellets are made by extruding moistened, powdered mixtures under high pressure through dies.

Liquid compositions of the invention can be prepared by mixing the active ingredient with a suitable liquid diluent medium. The resulting composition can be in the form of either a solution or suspension of the active ingredient.

The pesticidal compositions of the invention, whether in the form of solids or liquids, for most applications may also include a surface-active agent of the kind sometimes referred to in the art as a wetting, dispersing or emulsifying agent. These agents, which will be referred to hereinafter more simply as surface-active agents, cause the compositions to be easily dispersed in water and give aqueous sprays.

The surface-active agents employed can be of the anionic, cationic, or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated actylic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," vol. 31, Nos. 7–10 (1955) including, for example, the material known as Triton X–155 (100% alkylaryl polyether alcohol—U.S. Patent No. 2,504,064).

Generally, the surface-active agent will not comprise more than about 5% to 15% by weight of the composition depending, of course, upon the particular surface-active agent, the system in which it is placed and the result desired; in certain compositions, the percentage will be 1% or less. Usually, the minimum lower concentration will be 0.1%.

The active compound is, of course, applied in an amount sufficient to exert the desired pesticidal action.

The amount of the active ingredient present in the compositions as actually applied will vary with the manner of application, the particular pest for which control is sought, the purposes for which the application is being made, and like variables. In general, however, the pesticidal compositions will contain from about 0.5% to 99% by weight of the active ingredient.

Fertilizer materials, herbicidal agents, and other pest control agents such as insecticides, bactericides, nematocides and fungicides can be included in the compositions of the invention if desired.

In order that those skilled in the art may more completely understand the present invention and the preferred methods by which the same may be carried into effect, the following specific examples are offered:

Example 1

2,4,6-trichloro-1,3,5-triformyl benzene.—A 500 milliliter portion of 98% sulfuric acid is reacted with 60 grams (0.139 mol) of 1,3,5-tris-(dichloromethyl)-2,4,6-trichlorobenzene. The mixture is heated to 145° C. for six hours, then cooled, poured into ice and water, and a pink solid settling out of the resulting mixture is filtered and washed with water and dried. This crude solid is recrystallized from methyl ethyl ketone to give 26 grams (70% yield) of a sand colored solid melting at 197–198° C. The elemental analysis checks for the desired 2,4,6-trichloro-1,3,5-triformyl benzene.

| Element | Percent calculated | Percent actual |
|---|---|---|
| Carbon | 40.7 | 40.6 |
| Hydrogen | 1.1 | 1.4 |

Example 2

Inhibition of spore germination on glass slides by the test tube dilution method is shown for 2,4,6-trichloro-1,3,5-triformyl benzene by a procedure recommended by the American Phytopathological Society's Committee on Standardization of Fungicidal Tests. In this screen, the test chemical at 1000, 100, 10 and 1.0 p.p.m. is tested for ability to inhibit germination of spores from 7- to 10-day-old cultures of *Alternaria oleracea* (Mil.) and *Monilinia fructicola* (Wint.) Honey. These concentrations refer to the actual concentrations after diluting the test preparations with spore stimulant and spore suspension. A formulation containing the test compound, acetone, stock emulsifier solution and distilled water is used for this test. The concentration of toxicant in this formulation is 1250 parts per million. The concentrations given above are diluted from this original formulation and the concentration of emulsifier and acetone is not maintained. Germination records are taken after 20 hours of incubation at 22° C. by observing several microscope fields so that at least 100 spores of each fungus have been examined at each concentration. Copper sulfate is used as a standard reference material. The test compound is given an alphabetical rating which corresponds to the concentration that inhibits germination of half the spores ($ED_{50}$) in the test drops: AAA=0.01 to 0.1 p.p.m.; AA=0.1 to 1.0 p.p.m.; A=1.0 to 10 p.p.m.; B=10 to 100 p.p.m.; C=100 to 1000 p.p.m.; and D=1000 p.p.m. Using this procedure, the following results were obtained:

Culture tested: Rating
*Alternaria oleracea* _____ A
*Monilinia frusticola* _____ B Example 3

The tomato foliage disease test measures the ability of 2,4,6-trichloro-1,3,5-triformyl benzene to protect tomato foliage against infection by early blight fungus *Alternaria solani* (Ell. and Mart.) Jones and Grount and the late blight fungus *Phytophthora infestans* (Mont.) De Bary. The method used employed tomato plants, 5 to 7 inches high which are 4 to 6 weeks old. Duplicate plants, one set for each test fungus, are sprayed with the test formulation at 40 lbs./sq. in. air pressure while being rotated on a turntable in a hood. The center of the turntable is 45 inches from the nozzle of the spray gun. The test formulation containing the test compound, acetone, stock emulsifier solution and distilled water is applied at a concentration of 128 p.p.m. of the test chemical.

After the spray deposit is dry, treated plants and controls (sprayed with formulation less toxicant) are sprayed while being rotated on a turntable with aspore suspension containing approximately 20,000 conidia of *A. Solani* per ml., of 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse. After two days from the start of the test for early blight and three days for late blight lesion counts are made on the three uppermost fully expanded leaves. The data are converted to percent disease control based on the number of lesions obtained on the control plants and show 99% control for early blight and 100% control for late blight for the 2,4,6-trichloro-1,3,5-triformyl benzene.

Example 4

Air dry sterile soil is infested with the organism *Pythium sp*. The soil is placed in plastic pots and a dosage of 18.75 ml. of test formulation is poured onto the soil to give a rate of application equivalent to a dosage of 48 pounds per acre on a broadcast basis. This test formulation contains 2,4,6-trichloro-1,3,5-triformyl benzene, acetone, stock emulsifier solution and distilled water. The concentration of toxicant in this formulation is 2000 parts per million. The test formulation is thoroughly incorporated into the soil by emptying the contents of the pot into a container and shaking vigorously. A non-inoculated treated control is also run to determine the phytotoxicity of each test compound. Twenty-five Perfection peas are planted in the treated soil in each box. Each box receives 50 ml. of water and is placed in a humidity chamber maintained at 70° F. for 1 day. The boxes are then transferred to the greenhouse. Effectiveness of the test chemical is determined by the percentage of plants growing 14 days after treatment and planting. On this basis and for the 48 pounds per acre dosage the 2,4,6-trichloro-1,3,5-triformyl benzene exhibited an 80% stand for the inoculated soil and 100% stand for the non-inoculated control run to determine phytotoxicity.

Example 5

Air dry sterile soil is infested with the organism *Rhizoctonia solani*. The soil is placed in plastic pots and a dosage of 18.75 ml. of test formulation is poured onto the soil to give a rate of application equivalent to a dosage of 48 pounds per acre on a broadcast basis. This test formulation contains 2,4,6-trichloro-1,3,5-triformyl benzene, acetone, stock emulsifier solution and distilled water. The concentration of toxicant in this formulation is 2000 parts per million. The test formulation is thoroughly incorporated into the soil by emptying the contents of the pot into a container and shaking vigorously. A non-inoculated treated control is also run to determine the phytotoxicity of each test compound. Twenty-five Perfection peas are planted in the treated soil in each box. Each box receives 50 ml. of water and is placed in a humidity chamber maintained at 70° F. for 1 day. The boxes are then transferred to the greenhouse. Effectiveness of the test chemical is determined by the percentage of plants growing 14 days after treatment and planting. On this basis and for the 48 pounds per acre dosage the 2,4,6-trichloro-1,3,5-triformyl benzene exhibited a 60% stand for the inoculated soil and 100% stand for the non-inoculated control run to determine phytotoxicity.

Example 6

A test formulation containing 2,4,6-trichloro-1,3,5-triformyl benzene is examined for ability to inhibit the colonial growth of *Erwinia amylovora* (E.a.), *Xanthomonas phaseoli* (X.p.), *Staphylococcus aureus* (S.a.), and *Escherechia coli* (E.c.). The test formulation contains 0.1 g. of the test chemical, 4 ml. acetone, 2 ml. stock emulsifier solution (0.5% Triton X–155 in water by volume) and 74 ml. distilled water, the concentration of toxicant in the formulation being 1250 parts per million.

Two ml. of this formulation is dispensed into a test tube which is then placed into a water bath maintained at 44° C. From a stock preparation (also held at 44° C.), 8 ml. of 20 percent nutrient agar is added to the test tube giving a 1:5 dilution or a final concentration of 250 p.p.m. of 2,4,6-trichloro-1,3,5-triformyl benzene in the agar. The contents of the test tube are then thoroughly mixed, while still warm, with the aid of a Vortex type mixer and immediately poured into a sterily polystyrene Petri dish (100 x 15 mn.). After the agar in the plate has set, suspensions of each organism are simultaneously streaked onto the surface of the agar. After the plate is inoculated, it is incubated 24 to 48 hours at 30° C., after which time growth of each organism is noted. Using this procedure, the following results for inhibition of growth are found:

Concentration (p.p.m.) _____ 250
Percent control:
  E.a. _____ 100
  X.p. _____ 50
  S.a. _____ 0
  E.c _____ 100

Example 7

To evaluate the post-emergence activity of 2,4,6-trichloro-1,3,5-triformyl benzene applied to the foliage of seedling plants, as well as to the soil in which they are growing, two mixtures of seeds are planted in sterilized composted greenhouse soil. One seed mixture contains three broadleaf (buckwheat, turnip and aster) and the other contains three grass species (sorghum, Italian millet and perennial ryegrass). The soil is divided diagonally into two equal areas, and the broadleaves are seeded into one of these areas and the grasses into the other. The seeds are then covered uniformly with about ¼-inch of soil and watered, after which they are removed to the greenhouse and the test species are allowed to grow until one true leaf is present on the slowest growing broadleaf. This requires between 9 to 14 days depending upon the time of the year. When the plants (seedlings) have reached this stage of development the containers are sprayed at 10 p.s.i. uniformly covering the surface of the soil and the foliage with 40 ml. of test formulation at a dosage of 16 pounds per acre. Formulation contains the toxicant, equal volumes of water and acetone and 2 drops of Triton X–155.

Two weeks after treatment percent control is estimated. Using this procedure, a 50% control is exhibited for 2,4,6-trichloro-1,3,5-triformyl benzene on the three broadleaf species, and a 70% control on the three grass species.

Example 8

3,5,6-trichloro-1,2,4-triformyl benzene.—An 80 gram portion (0.36 mol) of trichloropseudocumene is dissolved in 1500 milliliters of carbon tetrachloride, and the resulting solution is heated to the boiling point of the carbon tetrachloride. While maintained at this temperature, 216 grams (3.04 mols) of chlorine gas is bubbled into the solution over a five hour period during which time the solution is exposed to ultraviolet light. After the gaseous chlorine addition, the mixture is stirred an additional hour, then cooled, and the solvent removed by distillation at subatmospheric pressure. The solid residue is recrystalized from n-heptane to give 134 grams (86% yield) of a solid melting at 159–160° C. The elemental analysis checks for the desired precursor 1,2,4-tris(dichloromethyl)-3,5,6-trichlorobenzene.

| Element | Percent calculated | Percent actual |
|---|---|---|
| Carbon | 25.1 | 25.1 |
| Hydrogen | 0.7 | 0.7 |

A 60 gram portion (0.139 mol) of this resulting solid precursor is dissolved in 500 milliliters of concentrated sulfuric acid and the mixture thus prepared is heated at 145° C. for seven hours. After heating the solution is cooled, poured into a mixture of ice and water and the solid settling out of this mixture is filtered, thus preparing 35.4 grams (96% yield) of crude material. This crude material is recrystallized from ethyl methyl ketone to give 14 grams (38% yield) of a solid melting at 196–197° C. The elemental analysis checks for the desired 3,5,6-trichloro-1,2,4-triformyl benzene.

| Element | Percent calculated | Percent actual |
|---|---|---|
| Carbon | 40.7 | 41.0 |
| Hydrogen | 1.1 | 1.6 |

Example 9

Air dry sterile soil is infested with the organism *Sclerotium rolfsii*. The soil is placed in plastic pots and dosages of test formulation are poured onto the soil to give the desired rate of application, e.g., 25 ml. is equivalent to a dosage of 64 pounds per acre on a broadcast basis. Each test formulation contains the test compound, acetone, stock emulsifier solution and distilled water. The concentration of toxicant in each formulation is 2000 parts per million. Each test formulation is thoroughly incorporated into the soil by emptying the contents of the pot into a container and shaking vigorously. A non-inoculated treated control is also run to determine the phytotoxicity of each test compound. Twenty-five Perfection peas are planted in the treated soil in each box. Each box receives 50 ml. of water and is placed in a humidity chamber maintained at 70° F. for one day. The boxes are then transferred to the greenhouse. Effectiveness of the test chemical is determined by the percentage of plants growing 14 or 18 days after treatment and planting, as shown in the tabular results below.

| Compound tested | Concentration, lbs./acre | Days after treatment | Percent stand Non-inoculated | Percent stand Inoculated |
|---|---|---|---|---|
| 2,4,6-trichloro-1,3,5-triformyl benzene | 48 | 14 | 100 | 9 |
| 3,5,6-trichloro-1,2,4-triformyl benzene | 48 | 14 | 100 | 60 |
| 3,5,6-trichloro-1,2,4-triformyl benzene | 64 | 18 | 100 | 76 |

Example 10

Nonplant parasitic nematodes (*Panagrellus redivivus*) are exposed to 3,5,6-trichloro-1,2,4-triformyl benzene in small watch glasses. Two watch glasses received dosages of a test formulation containing the test compound, acetone, stock emulsifier solution and distilled water. After the test dishes have been set up, the Panagrellus suspension is added to each watch glass. After these additions are made, the Petri dishes are closed; the two watch glasses thus measuring contact activity.

The organism is grown on cooked oatmeal which is sterilized in an autoclave before being centrally inoculated from an old culture. The culture is held at 22° C. and after 10 to 14 days the surface of the oatmeal is swarming with nematodes which are visible to the eye. Such a culture is used to prepare the test suspension. The concentration of the nematodes is adjusted so that each watch glass contains 30 to 40 nematodes. At the end of 48 hours mortality counts are made from which percent kill can be determined. Using this procedure, the 3,5,6-trichloro-1,2,4-triformyl benzene exhibits a 50% contact mortality at a concentration of 100 p.p.m.

It is to be understood that although the invention has been described with specific reference to particular embodiments thereof, it is not to be so limited since changes and alterations therein may be made which are within the full intended scope of this invention as defined by the appended claims.

I claim:
1. 3,5,6-trichloro-1,2,4-triformyl benzene.
2. 2,4,6-trichloro-1,3,5-triformyl benzene.

References Cited

UNITED STATES PATENTS

| | | | |
|---|---|---|---|
| 998,140 | 7/1911 | Weiler | 260—599 |
| 1,428,984 | 9/1922 | Schmidlin | 260—599 |
| 2,816,144 | 12/1957 | Harris | 260—599 |
| 3,146,086 | 8/1964 | Bluestone et al. | 260—599 XR |
| 3,207,792 | 9/1965 | Buchanan et al. | 260—599 XR |

FOREIGN PATENTS 1,229,061    11/1966    Germany.

BERNARD HELFIN, Primary Examiner

U.S. Cl. X.R.

71—123, 3; 260—599; 265—99; 424—333